(12) United States Patent
Chen et al.

(10) Patent No.: US 7,443,065 B2
(45) Date of Patent: Oct. 28, 2008

(54) COOLING FAN

(75) Inventors: Chien-Jung Chen, Jen-Wu Hsiang (TW); Hsien-Wen Liu, Taichung (TW); Hui-Chao Hsu, Kaohsiung (TW)

(73) Assignee: Yen Sun Technology Corp. (TW)

( * ) Notice: Subject to any disclaimer, the term of this patent is extended or adjusted under 35 U.S.C. 154(b) by 350 days.

(21) Appl. No.: 11/482,067

(22) Filed: Jul. 7, 2006

(65) Prior Publication Data

US 2007/0114859 A1  May 24, 2007

(30) Foreign Application Priority Data

Nov. 23, 2005  (TW) ............................... 94220318 U

(51) Int. Cl.
*H02K 9/00* (2006.01)
(52) U.S. Cl. ............................... 310/63; 310/71; 310/89
(58) Field of Classification Search .................... 310/63, 310/71, 68 R, 89, 254, 261
See application file for complete search history.

(56) References Cited

U.S. PATENT DOCUMENTS

| 6,841,957 | B2* | 1/2005 | Brown | 318/400.01 |
|---|---|---|---|---|
| 6,975,052 | B2* | 12/2005 | Uchida et al. | 310/71 |
| 7,078,844 | B2* | 7/2006 | Chang et al. | 310/254 |
| 7,132,769 | B2* | 11/2006 | Uchida et al. | 310/72 |
| 7,332,841 | B2* | 2/2008 | Hsu | 310/73 |
| 7,358,631 | B2* | 4/2008 | Morishitahara | 310/71 |
| 2002/0057022 | A1* | 5/2002 | Yamamoto | 310/58 |
| 2003/0117029 | A1* | 6/2003 | Horng et al. | 310/89 |

* cited by examiner

*Primary Examiner*—Thanh Lam
(74) *Attorney, Agent, or Firm*—Davidson, Berquist Jackson & Gowdey LLP

(57) ABSTRACT

A cooling fan includes: a casing having a base wall and a surrounding wall that extends transversely from the base wall, and that has an inner wall surface and a top opening; a stator mounted on the inner wall surface of the surrounding wall; a shaft protruding from the base wall; a fan blade unit including an annular hub that is journalled rotatably to the shaft, a supporting ring that surrounds the hub, and a plurality of blades that extend between and that are connected to the hub and the supporting ring; a rotor mounted on the supporting ring; and a cover in the form of a circuit board mounted on the top end face of the surrounding wall for covering the top opening in the casing and including a substrate formed with a central opening.

3 Claims, 5 Drawing Sheets

COOLING FAN

CROSS-REFERENCE TO RELATED APPLICATION

This application claims priority of Taiwanese application no. 094220318, filed on Nov. 23, 2005.

BACKGROUND OF THE INVENTION

1. Field of the Invention

The invention relates to a cooling fan, more particularly to a cooling fan that has a casing and a cover in the form of a circuit board.

2. Description of the Related Art

As shown in FIGS. 1 and 2, a conventional cooling fan 1 includes a casing 11, a fan blade unit 12, a stator 13 with four coil-mounting posts 131 and coils 132 mounted on the coil-mounting posts 131, a circuit board 14 with a substrate 141 and a control circuit 14 disposed on the substrate 141, and a cover 15.

The casing 11 includes a base wall 110, a surrounding wall 114 defining an accommodating space, extending upwardly from a peripheral edge of the base wall 110, and defining a top opening and an outlet 112 for passage of fluid flow therethrough, a shaft 111 extending upwardly from a center of the base wall 110, and a pair of board-mounting posts 113 extending upwardly from the base wall 110 and disposed adjacent to the surrounding wall 114 and opposite to the outlet 112.

The fan blade unit 12 includes an annular hub 121 journalled rotatably to the shaft 111 of the casing 11, a plurality of fan blades 122 extending outwardly from the annular hub 121, and a ring-shaped rotor 123 connected to ends of the fan blades 122.

The cover 15 covers the top opening of the surrounding wall 114 and is formed with a central opening 151 for passage of fluid flow into the accommodating space in the casing 11.

The circuit board 14 is provided with a sensing component 142 for controlling signals supplied to the stator 13 in a conventional manner.

During operation, air flow is introduced into the accommodating space in the casing 11 through the central opening 151 and is discharged through the outlet 112 upon rotation of the fan blade unit 12.

SUMMARY OF THE INVENTION

The object of the present invention is to provide a cooling fan that has a smaller size and that is less expensive to manufacture as compared to the aforesaid conventional cooling fan.

Accordingly, a cooling fan of this invention comprises: a casing defining an accommodating space, and having a base wall and a surrounding wall that extends transversely from the base wall, and that has an inner wall surface, a side opening for passage of fluid flow out of the accommodating space, and a top opening defined by a top end face; a stator mounted on the inner wall surface of the surrounding wall; a shaft protruding from the base wall into the accommodating space and defining a rotation axis; a fan blade unit disposed in the accommodating space and including an annular hub that is journalled rotatably to the shaft, a supporting ring that surrounds the hub, and a plurality of blades that extend between and that are connected to the hub and the supporting ring; a rotor mounted on the supporting ring and coupled magnetically to the stator; and a cover in the form of a circuit board, disposed opposite to the base wall, mounted on the top end face of the surrounding wall for covering the top opening in the casing, and including a substrate and a control circuit disposed on the substrate and coupled to the stator, the substrate being formed with a central opening for passage of fluid flow into the accommodating space when the fan blade unit is driven to rotate about the rotation axis.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
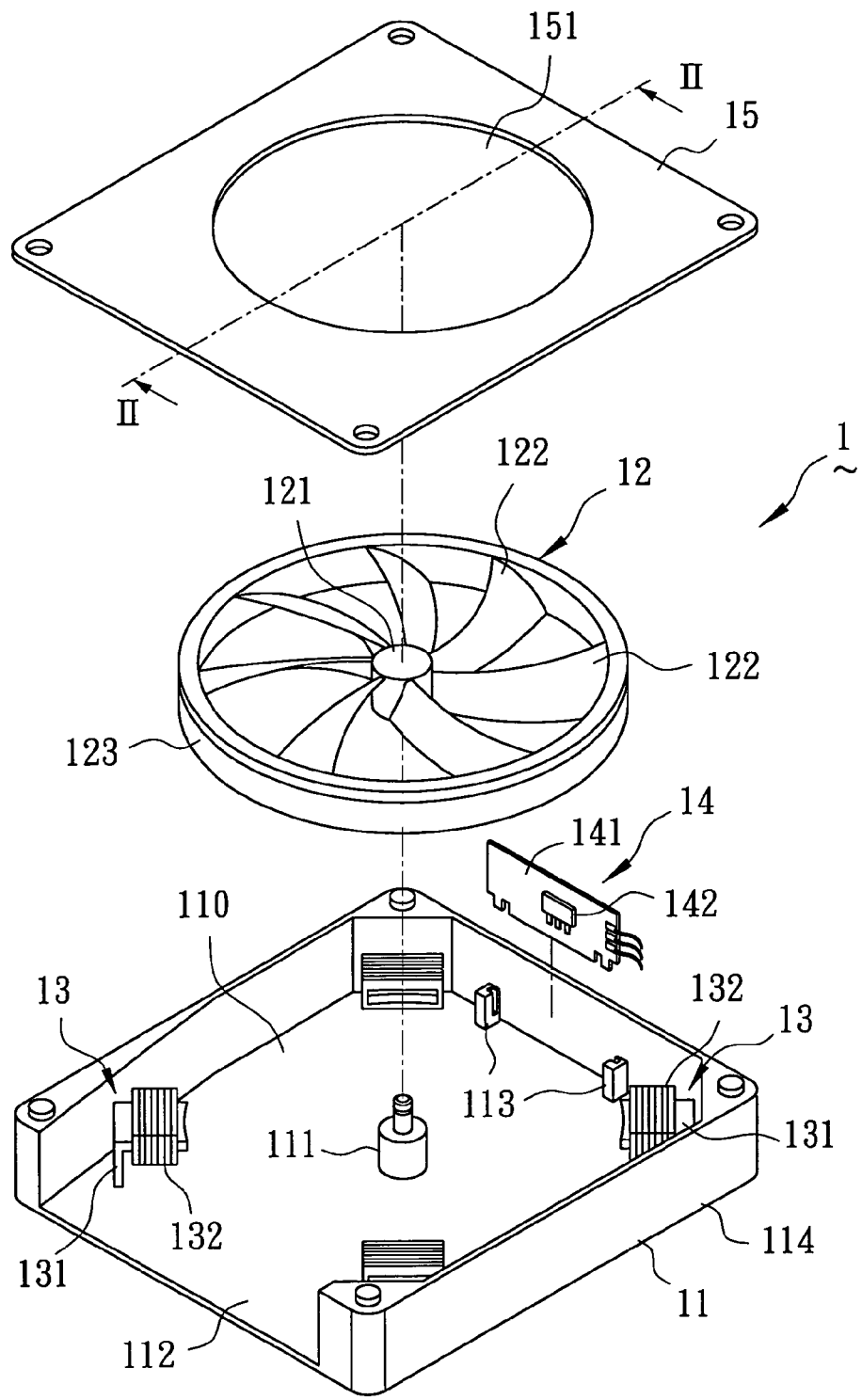
FIG. 1 is an exploded perspective view of a conventional cooling fan.
Figure 2:
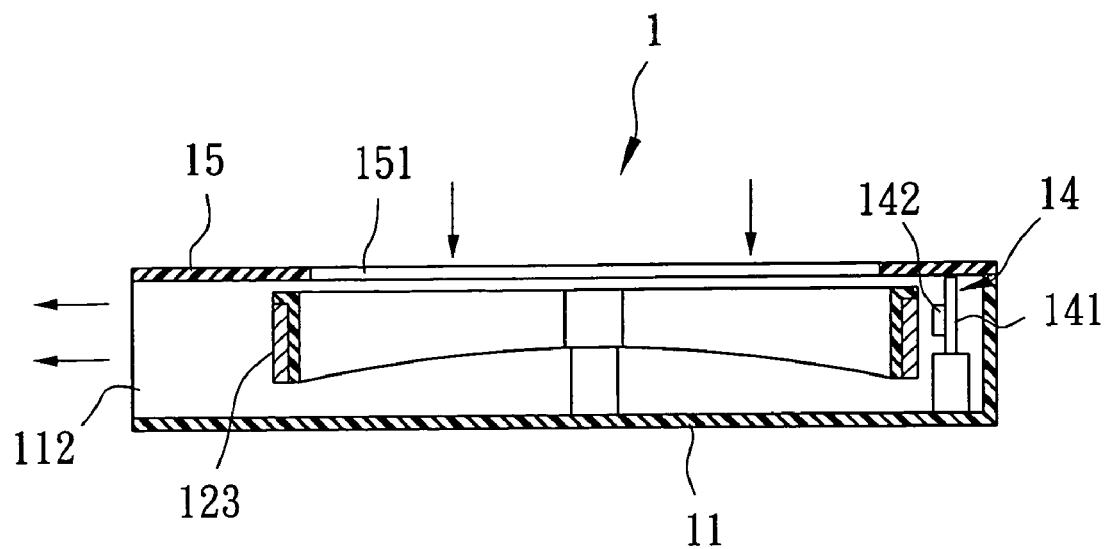
FIG. 2 is a sectional view taken along line II-II in FIG. 1.

Before the present invention is described in greater detail with reference to the accompanying preferred embodiments, it should be noted herein that like elements are denoted by the same reference numerals throughout the disclosure.

Figure 4:
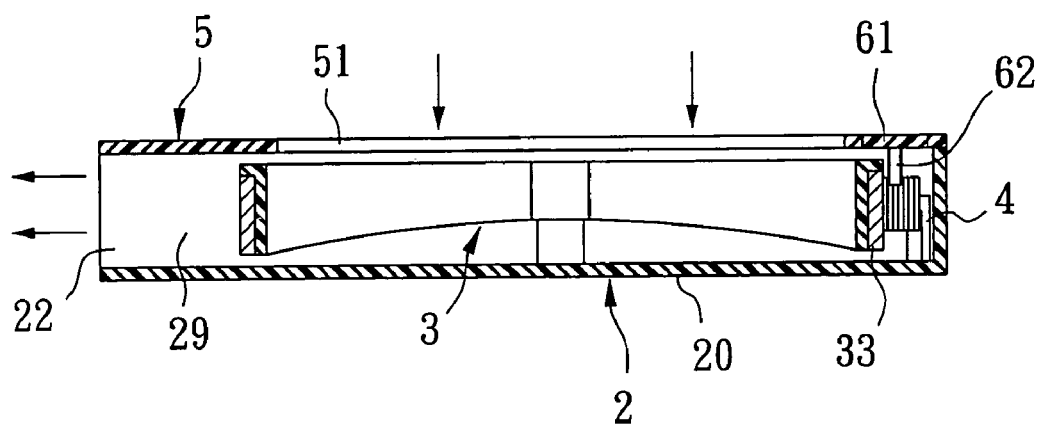
FIG. 4 is a sectional view taken along line IV-IV in FIG. 3.
Figure 3:
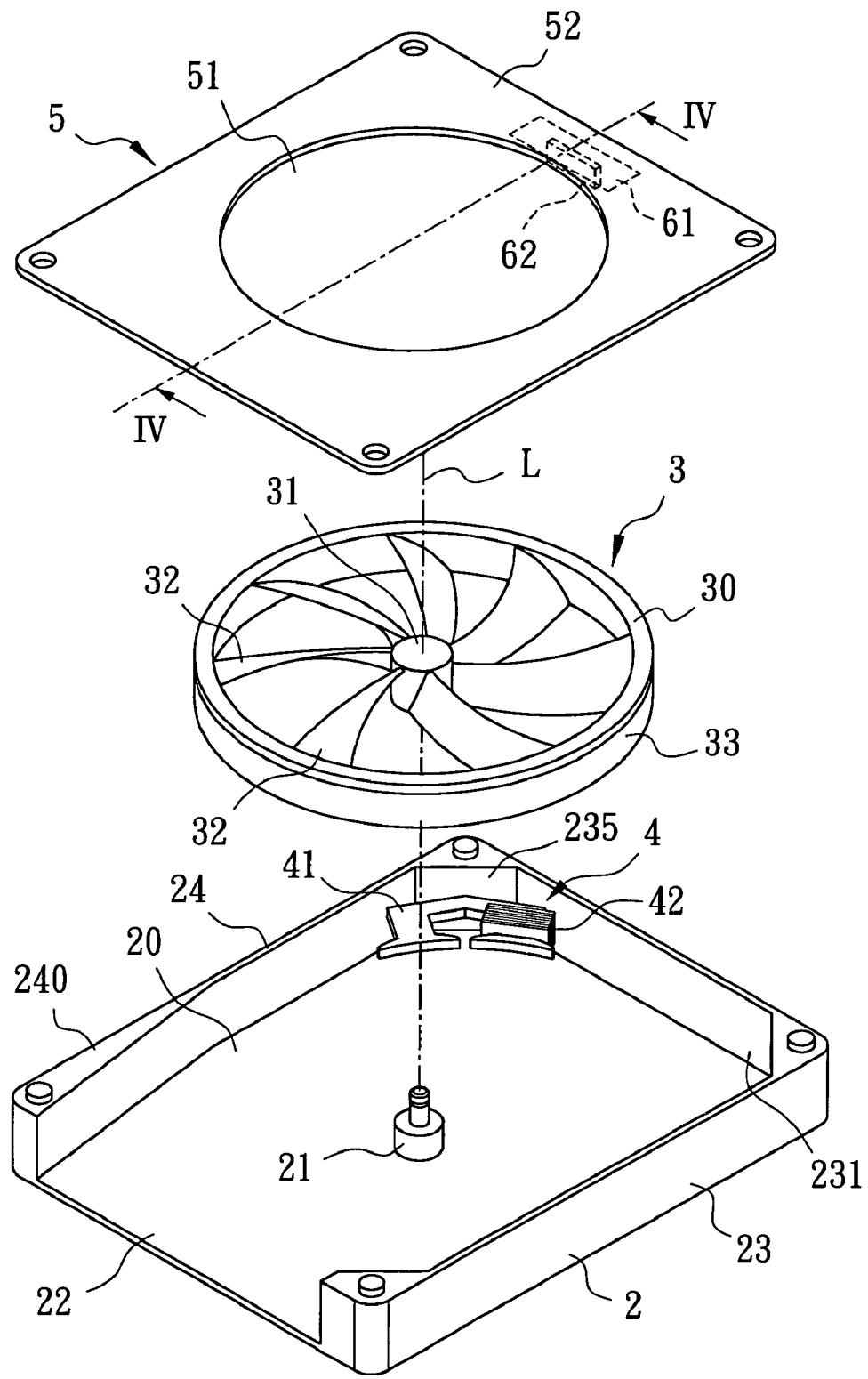
FIG. 3 is an exploded perspective view of the first preferred embodiment of a cooling fan according to the present invention.

Referring to FIGS. 3 and 4, the first preferred embodiment of a cooling fan according to the present invention is shown to include: a casing 2 defining an accommodating space 29, and having a base wall 20 and a surrounding wall 23 that extends transversely from the base wall 20, and that has an inner wall surface 231, a side opening 22 for passage of fluid flow out of the accommodating space 29, and a top opening 24 defined by a top end face 240; a stator 4 mounted on the inner wall surface 231 of the surrounding wall 23; a shaft 21 protruding from the base wall 20 into the accommodating space 29 and defining a rotation axis (L); a fan blade unit 3 disposed in the accommodating space 29 and including an annular hub 31 that is journalled rotatably to the shaft 21, a supporting ring 30 that surrounds the hub 31, and a plurality of blades 32 that extend between and that are connected to the hub 31 and the supporting ring 30; a rotor 33 mounted on the supporting ring 30 and coupled magnetically to the stator 4; and a cover 5 in the form of a circuit board, disposed opposite to the base wall 20, mounted on the top end face 240 of the surrounding wall 23, and including a substrate 52 and a control circuit 61 disposed on the substrate 52 and coupled to the stator 4, the substrate 52 being formed with a central opening 51 for passage of fluid flow into the accommodating space 29 when the fan blade unit 3 is driven to rotate about the rotation axis (L).

In this embodiment, the stator 4 includes a coil unit mounted on a corner 41 defined by the surrounding wall 235. The coil unit includes a coil-mounting post 41 and a coil 42 wound on the coil-mounting post 41.

The control circuit 61 is provided with a sensing component 62 for controlling signals supplied to the stator 4 in a conventional manner.

During operation, air flow is introduced into the accommodating space 29 in the casing 2 through the central opening 51 in the substrate 52, and is discharged through the side opening 22 in the casing 2 upon rotation of the fan blade unit 3.

Figure 5:
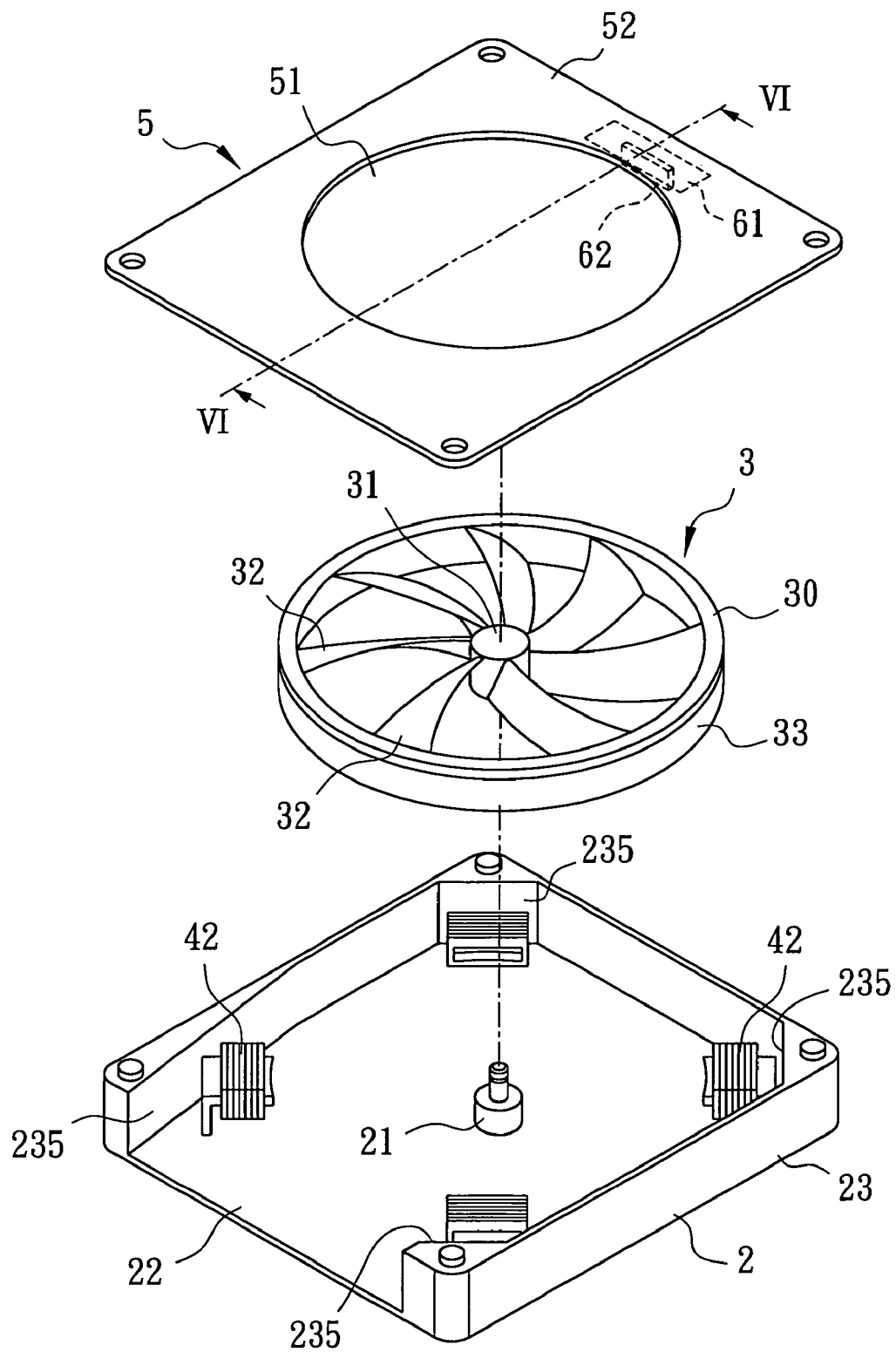
FIG. 5 is an exploded perspective view of the second preferred embodiment of the cooling fan according to the present invention.
Figure 6:
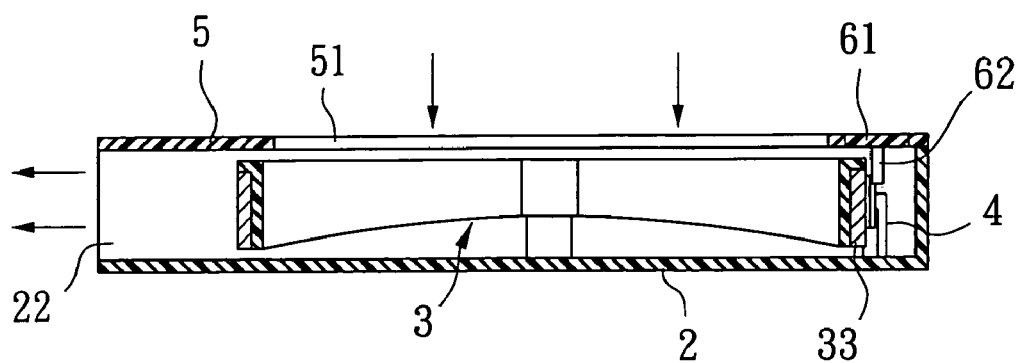
FIG. 6 is a sectional view taken along line VI-VI in FIG. 5.

Referring to FIGS. 5 and 6, the second preferred embodiment of this invention is shown to be similar to the first preferred embodiment, the main difference residing in that the surrounding wall 23 defines four corners 235 around the shaft 21, and that the stator 4 includes four coil units mounted respectively on the corners 235 of the surrounding wall 23.

By directly incorporating the function of the circuit board 14 of the conventional cooling fan 1 into the cover 5 of the cooling fan of this invention, the board-mounting posts 113 of the conventional cooling fan 1 can be dispensed with, and the size and the manufacturing cost of the cooling fan of this invention can be considerably reduced.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A cooling fan comprising:
   a casing defining an accommodating space, and having a base wall and a surrounding wall that extends transversely from said base wall, and that has an inner wall surface, a side opening for passage of fluid flow out of said accommodating space, and a top opening defined by a top end face;
   a stator mounted on said inner wall surface of said surrounding wall;
   a shaft protruding from said base wall into said accommodating space and defining a rotation axis;
   a fan blade unit disposed in said accommodating space and including an annular hub that is journalled rotatably to said shaft, a supporting ring that surrounds said hub, and a plurality of blades that extend between and that are connected to said hub and said supporting ring;
   a rotor mounted on said supporting ring and coupled magnetically to said stator; and
   a cover in the form of a circuit board disposed opposite to said base wall, mounted on said top end face of said surrounding wall for covering said top opening in said casing, and including a substrate and a control circuit disposed on said substrate and coupled to said stator, said substrate being formed with a central opening for passage of fluid flow into said accommodating space when said fan blade unit is driven to rotate about said rotation axis.

2. The cooling fan as claimed in claim 1, wherein said surrounding wall defines a corner, said stator including a coil unit mounted on said corner.

3. The cooling fan as claimed in claim 1, wherein said surrounding wall defines four corners around said shaft, said stator including four coil units mounted respectively on said corners.

* * * * *